US00RE34956E

United States Patent [19]

Djordjevic

[11] E Patent Number: Re. 34,956

[45] Reissued Date of Patent: May 30, 1995

[54] DISTRIBUTOR TYPE FUEL INJECTION PUMP

[75] Inventor: Ilija Djordjevic, East Granby, Conn.

[73] Assignee: Stanadyne Automotive Corp., Windsor, Conn.

[21] Appl. No.: 131,532

[22] Filed: Oct. 4, 1993

Related U.S. Patent Documents

Reissue of:

[64] Patent No.: 5,215,449
Issued: Jun. 1, 1993
Appl. No.: 803,130
Filed: Dec. 5, 1991

[51] Int. Cl.[6] ..... F04B 19/02; F04B 23/00; F04B 49/00

[52] U.S. Cl. ..... 417/462; 417/304; 417/440

[58] Field of Search ..... 417/462, 440, 304, 307, 417/310, 302, 303, 259, 261, 263

[56] References Cited

U.S. PATENT DOCUMENTS

| | | | |
|---|---|---|---|
| 2,227,127 | 12/1940 | Dillstrom . | |
| 4,178,141 | 12/1979 | Scheying | 417/498 |
| 4,200,072 | 4/1980 | Bailey | 417/462 |
| 4,385,610 | 5/1983 | Leblanc | 123/447 |
| 4,401,083 | 8/1983 | Leblanc | 123/449 |
| 4,406,263 | 9/1983 | Leblanc et al. | 123/357 |
| 4,473,048 | 9/1984 | Leblanc et al. | 123/357 |
| 4,497,299 | 2/1985 | Schechter | 417/516 |
| 4,498,442 | 2/1985 | Tissot | 123/447 |
| 4,499,884 | 2/1985 | Skinner | 417/462 |
| 4,501,246 | 2/1985 | Leblanc | 417/487 |
| 4,505,245 | 3/1985 | Lintott | 123/451 |
| 4,555,223 | 11/1985 | Budecker et al. | 417/462 |
| 4,583,509 | 4/1986 | Schechter et al. | 417/442 |
| 4,691,679 | 9/1987 | Lakin | 417/462 |
| 4,757,795 | 7/1988 | Kelly | 123/506 |
| 4,798,189 | 1/1989 | Thornthwaite et al. | 417/462 |
| 4,889,096 | 12/1989 | Brunel | 417/462 |
| 4,896,633 | 1/1990 | Junghans et al. | 123/90.12 |
| 4,920,940 | 5/1990 | Harris et al. | 417/462 |
| 4,940,036 | 7/1990 | Duplat | 417/462 |
| 4,971,012 | 11/1990 | Brunnel et al. | 123/450 |
| 5,044,893 | 9/1991 | Collingborn | 417/279 |
| 5,044,898 | 9/1991 | Harris | 417/462 |
| 5,059,096 | 10/1991 | Harris | 417/462 |
| 5,080,563 | 1/1992 | Tomsett | 417/462 |
| 5,099,814 | 3/1992 | Ament | 417/462 |
| 5,101,798 | 4/1992 | Tomsett | 417/440 |
| 5,103,792 | 4/1992 | Winkler et al. | 123/506 |

FOREIGN PATENT DOCUMENTS

| | | |
|---|---|---|
| 430234 | 11/1938 | Belgium . |
| 2155674 | 5/1973 | France . |
| 1053245 | 3/1959 | Germany . |

*Primary Examiner*—Richard A. Bertsch
*Assistant Examiner*—Charles G. Freay
*Attorney, Agent, or Firm*—Chilton, Alix & Van Kirk

[57] ABSTRACT

A fuel injection pump having a fixed pump body with a pumping chamber having a plurality of plunger bores, a plunger mounted in each plunger bore for reciprocation, a cam rotatable for reciprocating the plungers to periodically supply an intake charge of fuel to the pumping chamber and deliver a high pressure charge of fuel from the pumping chamber for fuel injection and to sequentially position the plungers in distributor valve positions thereof to deliver the high pressure charges of fuel, via distributor ports in the plunger bores, to a plurality of distributor outlets. In one version of the pump, the plunger bores are angularly spaced about and extend radially inwardly to a central coaxial bore, the rotary cam is an annular cam which actuates the plungers inwardly to deliver the high pressure charges of fuel, and a poppet valve is mounted in the central coaxial bore to supply fuel to and spill fuel from the pumping chamber. A pressure regulator has a fuel inlet opening in axial alignment with the poppet valve and which is closed by the poppet valve in its open position to increase the rate of fuel supply to the pumping chamber.

33 Claims, 9 Drawing Sheets

DISTRIBUTOR TYPE FUEL INJECTION PUMP

Matter enclosed in heavy brackets [ ] appears in the original patent but forms no part of this reissue specification; matter printed in italics indicates the additions made by reissue.

BACKGROUND AND SUMMARY OF THE INVENTION

The present invention relates to fuel injection pumps of the type having a pump body with pumping chamber having a plurality of plunger bores, a plunger mounted in each plunger bore for reciprocation, one or more cams providing periodic intake and pumping strokes of the plungers for supplying intake charges of fuel to the pumping chamber and delivering high pressure charges of fuel from the pumping chamber for fuel injection, and a distributor system for distributing the high pressure charges of fuel from the pumping chamber sequentially to a plurality of fuel injectors of an associated internal combustion engine (such fuel injection pumps being referred to herein as "Distributor Type Fuel Injection Pumps").

Distributor Type Fuel Injection Pumps normally employ a rotary distributor for distributing the high pressure charges of fuel sequentially to the fuel injectors. The rotary distributor conventionally comprise a distributor head with a plurality of distributor outlets, one for each fuel injector, and a rotor mounted for distributing the high pressure charges of fuel sequentially to the distributor outlets. In such pumps, the pump body may be fixed or rotatable, and which, if rotatable, is usually rotatable with the distributor rotor. Because the fuel charges are delivered at a high pressure, the relatively rotating surfaces of the distributor head and rotor are required to have a very precise rotational fit (for example, having a diametral clearance of 80–100 millionths of an inch) to ensure adequate sealing and lubrication. If the pump body is fixed, the relatively rotating surfaces of the pump body and distributor rotor are required to have a similar rotational fit for supplying the high pressure charges of fuel from the pumping chamber to the rotor. Distributor type fuel injection pumps with either a fixed or rotating pump body have the following disadvantages:

(a) the required precise fit of the relatively rotating surfaces substantially increases the cost of manufacture and assembly of the pump;

(b) during pump operation, particularly at high speed, a substantial amount of heat is generated by the thin layer of fuel lubricant between the relatively rotating surfaces;

(c) adequate lubrication of the relatively rotating surfaces is difficult to achieve at high speed and with low viscosity fuels such as gasoline and methanol;

(d) the temperature of the distributor head must be maintained at approximately the same temperature as the distributor rotor throughout the full range of operation of the pump and particularly as the rotor temperature increases rapidly during cold starting and rapid acceleration; otherwise, the resulting unequal thermal expansion of the parts will cause inadequate lubrication and rotor seizure; and (e) a charge delivery pressure of 12,000 psi and higher is difficult to achieve due to thermal, rotational and structural aspects of conventional rotary distributor pump design.

In certain conventional Distributor Type Fuel Injection Pumps having a rotary distributor, the plungers are mounted for radial reciprocation in a pump body which rotates with the distributor rotor to deliver the high pressure charges of fuel directly to the distributor rotor. This type of pump has certain additional disadvantages and problems because of the centrifugal force on the plungers and the valving and sealing problems associated with supplying fuel to and/or spilling fuel from the rotating pump body. Some pumps of this type employ an electromagnetic control valve for controlling the size and/or timing of each high pressure charge by regulating the intake charge quantity of fuel and/or the spill timing of the beginning and/or ending of the fuel injection event. There are additional disadvantages and problems associated with the use of an electromagnetic control valve for supplying fuel to and/or spilling fuel from the rotating pump body.

A principal aim of the present invention is to provide a new and improved Distributor Type Fuel Injection Pump having a distributor system which avoids the disadvantages and problems associated with the use of a rotary distributor and rotating pump body.

Another aim of the present invention is to provide a new and improved Distributor Type Fuel Injection Pump having a high pressure chamber with a small dead volume and capable of delivering charges of fuel at 12,000 psi and higher.

Another aim of the present invention is to provide a new and improved Distributor Type Fuel Injection Pump of the type having a non-rotating pumping chamber body and providing one or more of the following advantages over conventional Distributor Type Fuel Injection Pumps of that type:

(a) capable of delivering charges of fuel at higher pressure;

(b) useful with low viscosity fuels such as gasoline and methanol;

(c) capable of being manufactured and assembled more economically and with fewer parts; and (d) provides improved performance over a full range of pump operation.

Another aim of the present invention is to provide a new and improved Distributor Type Fuel Injection Pump having a non-rotating pumping chamber body and a cooperating electromagnetic control valve which together provide the following advantages:

(a) high pressure chamber with small dead volume;

(b) improved valve responsiveness;

(c) low valve wear and long useful valve life;

(d) high electromagnetic actuating force;

(e) low manufacturing cost; and (f) precise control of the size and timing of the injected fuel charge.

A further aim of the present invention is to provide a new and improved Distributor Type Fuel Injection Pump having a supply pressure regulator and electromagnetic control valve which cooperate to provide one or more of the following advantages:

(a) inlet pressure regulation and fuel accumulation to provide high rate of fuel delivery to the high pressure chamber during the intake strokes; and b) operable to spill hot fuel from the pumping chamber during the pumping strokes and to divert hot spilled fuel from being directly resupplied to the pumping chamber during the following intake strokes.

A further aim of the present invention is to provide in a Distributor Type Fuel Injection Pump of the type having a non-rotating pumping chamber body; a new and improved system for (a) supplying fuel from a supply pump to the high pressure chamber during the intake strokes; (b) controlling the fuel inlet pressure to ensure an adequate supply of fuel to the high pressure chamber during the intake strokes; (c) spilling fuel from the high pressure chamber without excessive back pressure during the pumping strokes; and (d) distributing the high pressure charges of fuel from the high pressure chamber to the distributor outlets in a new and improved manner which does not required a distributor rotor.

In accordance with another aim of the present invention, a new and improved Distributor Type Fuel Injection Pump is provided which (a) can be more economically manufactured; (b) can deliver charges of fuel from the high pressure chamber at 12,000 psi and higher; (c) can be used with internal combustion engines having two to eight cylinders or more; (d) has a modular design with only a few parts specifically designed for the number of fuel injectors; and (e) is electrically controlled to precisely regulate the size and/or timing of the injected fuel charge.

Other objects will be in part obvious and in part pointed out more in detail hereinafter.

A better understanding of the invention will be obtained from the following detailed description and the accompanying drawings of illustrative applications of the invention.

DESCRIPTION OF PREFERRED EMBODIMENTS

Figure 1:
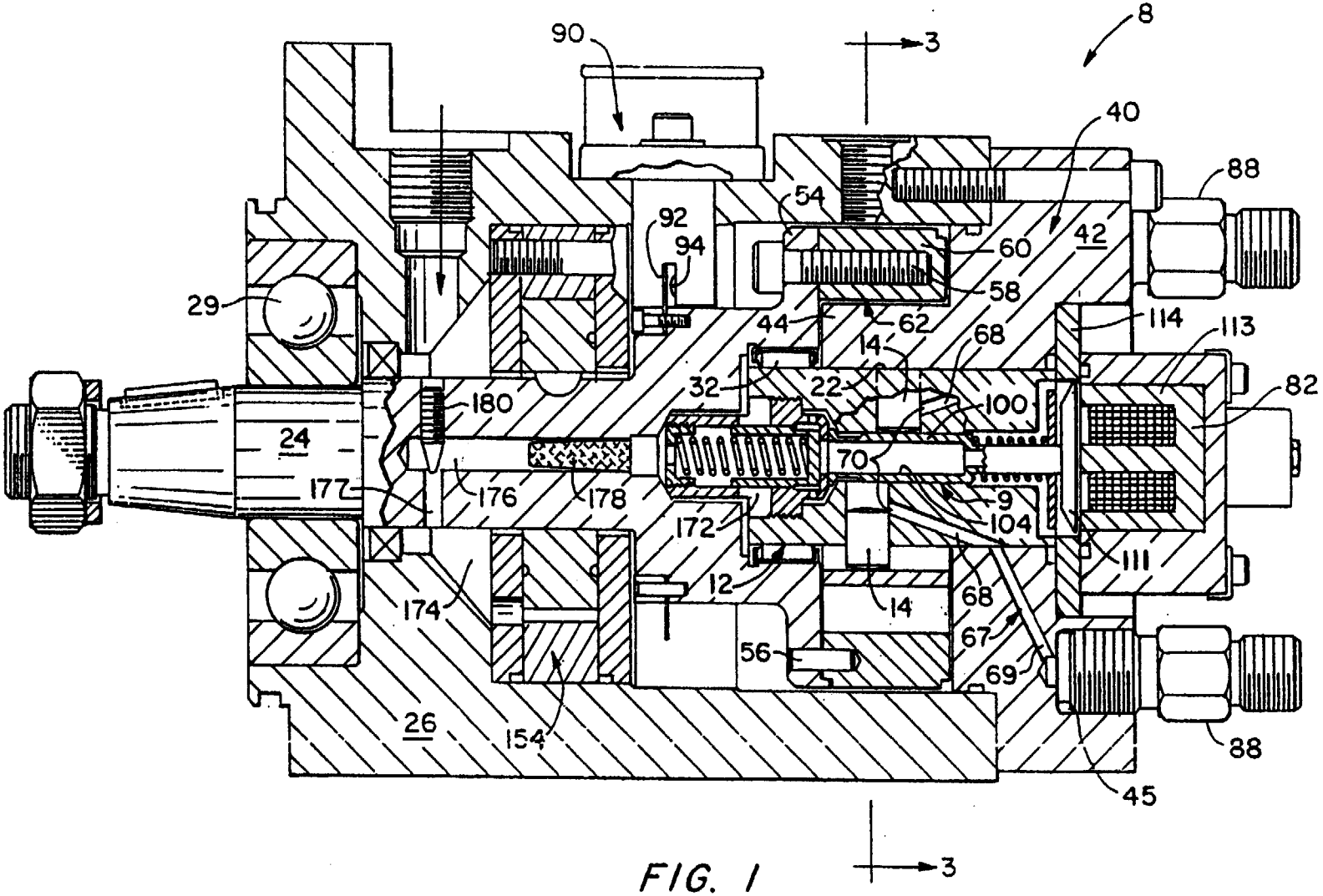
FIG. 1 is a longitudinal section view, partly broken away and partly in section, of one type of fuel injection pump incorporating an embodiment of the present invention.
Figure 2:
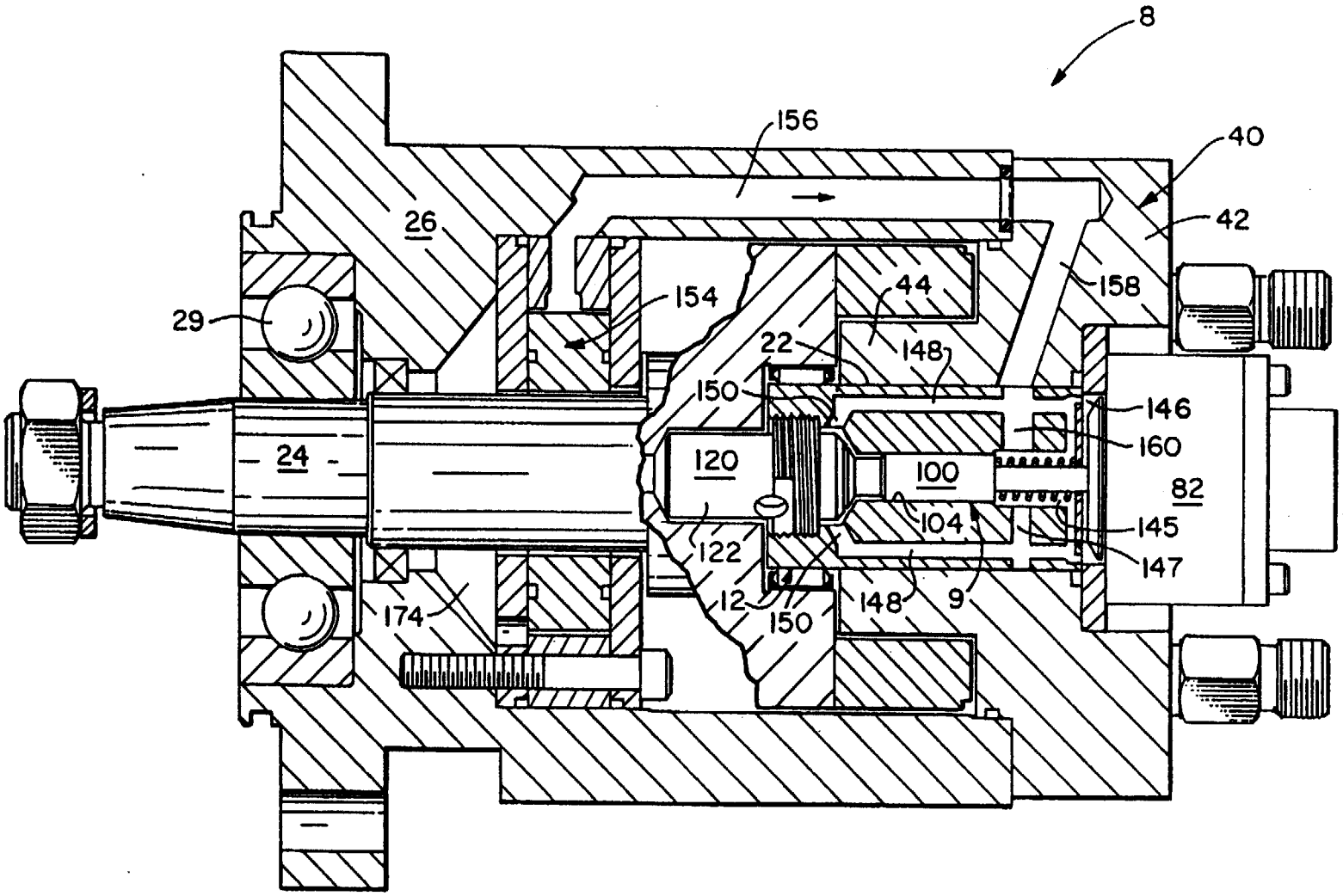
FIG. 2 is a different longitudinal section view, partly broken away and partly in section, of the fuel injection pump, showing additional details of the pump.

In the drawings, the same numerals are used to identify the same or like functioning parts or components. FIGS. 1-7 show an exemplary Distributor Type Fuel Injection Pump 8 incorporating an embodiment of the present invention. The pump 8 has an electrical control valve 9 for regulating the size and timing of each injected charge. The control valve 9 may be employed to provide a pump-spill or spill-pump-spill mode of operation or a fill-spill mode of operation of the type described in U.S. Pat. No. 4,757,795, dated Jul. 19, 1988 and entitled "Method And Apparatus For Regulating Fuel Injection Timing And Quantity". The pump 8 is hereafter described having such a fill-spill mode of operation. Therefore, U.S. Pat. No. 4,757,795, which is incorporated herein by reference, should be referred to for any details of the described fill-spill mode of operation not disclosed herein.

The exemplary pump 8 is designed for use with a six cylinder engine. The pump 8 has a fixed pump body 12 having a pumping chamber 20 with six equiangularly spaced radial bores 16. Six plungers 14, one for each fuel injector (not shown), are mounted in the six bores 16. The pump body 12 is in the form of a thick sleeve having an outer cylindrical surface 22 and a stepped coaxial through bore 23. The six plunger bores 16 extend radially inwardly from the outer cylindrical surface 22 to the central coaxial bore 23. The pump body 12 and plungers 14 are made of a suitable, wear resistant steel alloy. The plunger bores 16 and plungers 14 are precisely lapped or honed to have a very precise fit (e.g., having a typical diametral clearance of 80–140 millionths of an inch for diesel fuel and as low as 50 millionths of an inch for low viscosity fuels such as gasoline and methanol).

A pump drive shaft 24 is driven by the associated engine at one-half engine speed in the case of a four stroke engine and at engine speed in the case of a two stroke engine. The drive shaft 24 is rotatably mounted coaxial with the pump body 12 by a ball bearing 29 supported by the pump housing 26 and by a roller bearing 32 supported by the inner end of the pump body 12. A fixed head 40 forming part of the housing 26 has a coaxial, cylindrical bore receiving and supporting the pump body 12. The head 40 is made of steel whereas the rest of the housing 26 is preferably made of aluminum. The pump body 12 has a light press fit within the head 40 to seal their cylindrical interface against fuel leakage. The head 40 comprises an outer distributor head 42 and an inner roller shoe support hub 44. The distributor head 42 has six equiangularly spaced distributor outlets 45, one for each fuel injector. The hub 44 has six equiangularly spaced radial slots 46 for supporting roller shoes 48 for the six plungers 14. The slots 46 extend to the inner axial end of the hub 44 to facilitate machining the slots 46. The hub 44 may be integrally formed with the pump body 12 (instead of the distributor head 42) to facilitate machining the slots 46 when an uneven number of plungers 14 and slots 46 are provided.

The six plunger bores 16 are provided in two axially spaced planes (with the bores 16 alternating between planes) to provide two axially spaced banks of three bores 16 each. The two banks of bores 16 have an axial offset less than the diameter of the bores 16 to provide an axial overlap. Each radial bore 16 in each plane intersects each adjacent radial bore 16 in the other plane to form a small connecting port 50 at their inner ends. Also, adjacent bores 16 of each bank preferably intersect at their inner ends to form a similar small connecting port 51. Additional passages are not required for connecting the radial bores 16 and such that the pumping chamber 20 in the pump body 12 is formed solely by the six intersecting radial bores 16. The plungers 14 are dimensioned to avoid engagement at their inner limit positions and yet to minimize the remaining dead volume of the pumping chamber 20. The axial offset of the two banks of bores 16 and the diameter of a central valve bore 104 (hereafter described) are optimized to provide bore connecting ports 50, 51 of appropriate size and to minimize the dead volume of the pumping chamber 20.

The drive shaft 24 has an inner radial flange 54 to which an annular cam ring 60 is secured by a locating pin 56 and an annular arrangement of five machine screws 58. The cam ring 60 has an internal cam 62 which encircles the pump body 12 and hub 44. The cam 62 has five angularly spaced cam lobes 64 (i.e., one less than the number of plungers 14) which are engageable by plunger actuating rollers 66 for periodically camming the plungers 14 inwardly together during rotation of the shaft 24. If desired, a suitable mechanism (not shown) may be provided for angularly adjusting the cam ring 60 relative to the drive shaft 24 or the drive shaft 24 relative to the engine, in each case to adjust the plunger stroke timing relative to the engine. Otherwise, the cam ring 60 provides fixed plunger stroke timing.

The rollers 66, roller shoes 48 and internal cam 62 have an axial width substantially greater than the total axial width of the two banks of plungers 14. Accordingly, the plunger actuating forces are transmitted to the cam 62 along a greater axial length to reduce the roller pressure on the cam 62. The plunger diameter and stroke are selected to optimize the roller pressure and plunger stroke for the largest volume charge to be injected by the pump.

The five cam lobes 64 have the same angular pitch as the rollers 66 and plungers 14 so that five of the six plungers 14 are actuated inwardly together during each pumping stroke to deliver a high pressure charge of fuel from the pumping chamber 20. The sixth or remaining plunger 14 is employed as a distributor valve to connect the pumping chamber 20 to a distributor outlet 45. Each plunger bore 16 is connected to a corresponding distributor outlet 45 via a distributor bore 67 provided by interconnecting bores 68, 69 of the same diameter in the pump body 12 and distributor head 42. Each distributor bore 67 forms a distributor port 70 in the plunger bore 16 which is opened and closed by the corresponding plunger 14. The plungers 14 are sequentially positioned by the cam 62 during rotation of the cam ring 60 to open the six distributor ports 70 in sequence and thereby deliver the high pressure charges of fuel to the six distributor outlets 45 in sequence.

Figure 3:
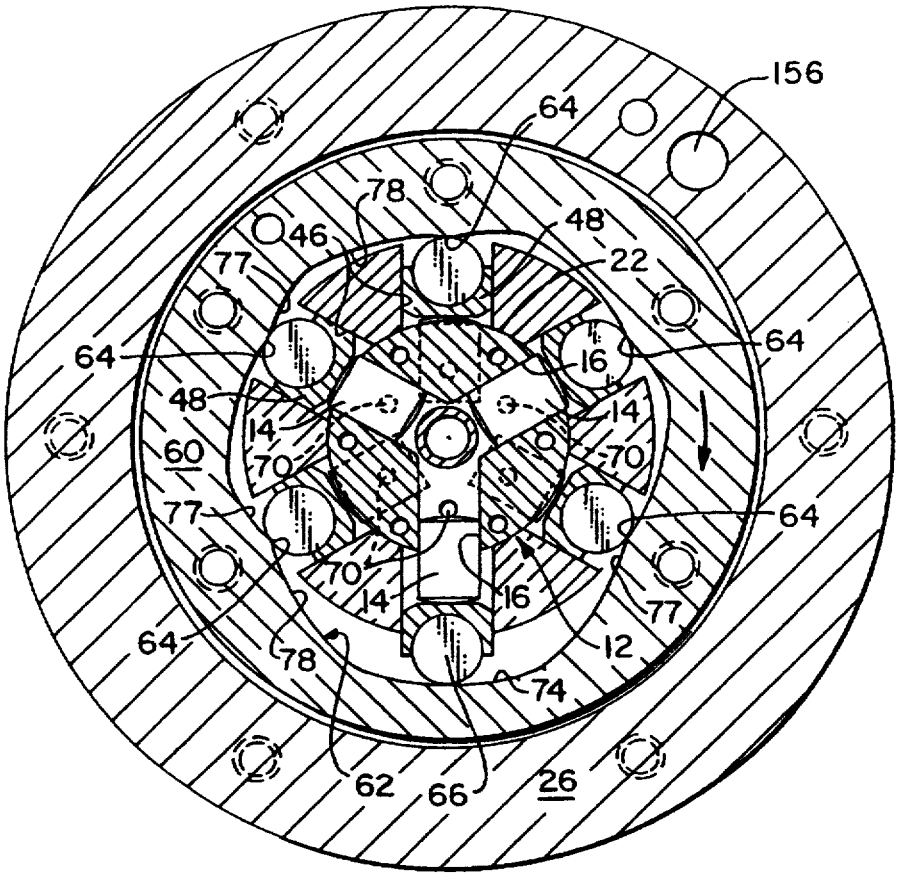
FIG. 3 is a transverse section view, partly in section, taken substantially along line 3—3 of FIG. 1, showing a cam and plunger mechanism of the fuel injection pump.
Figure 8:
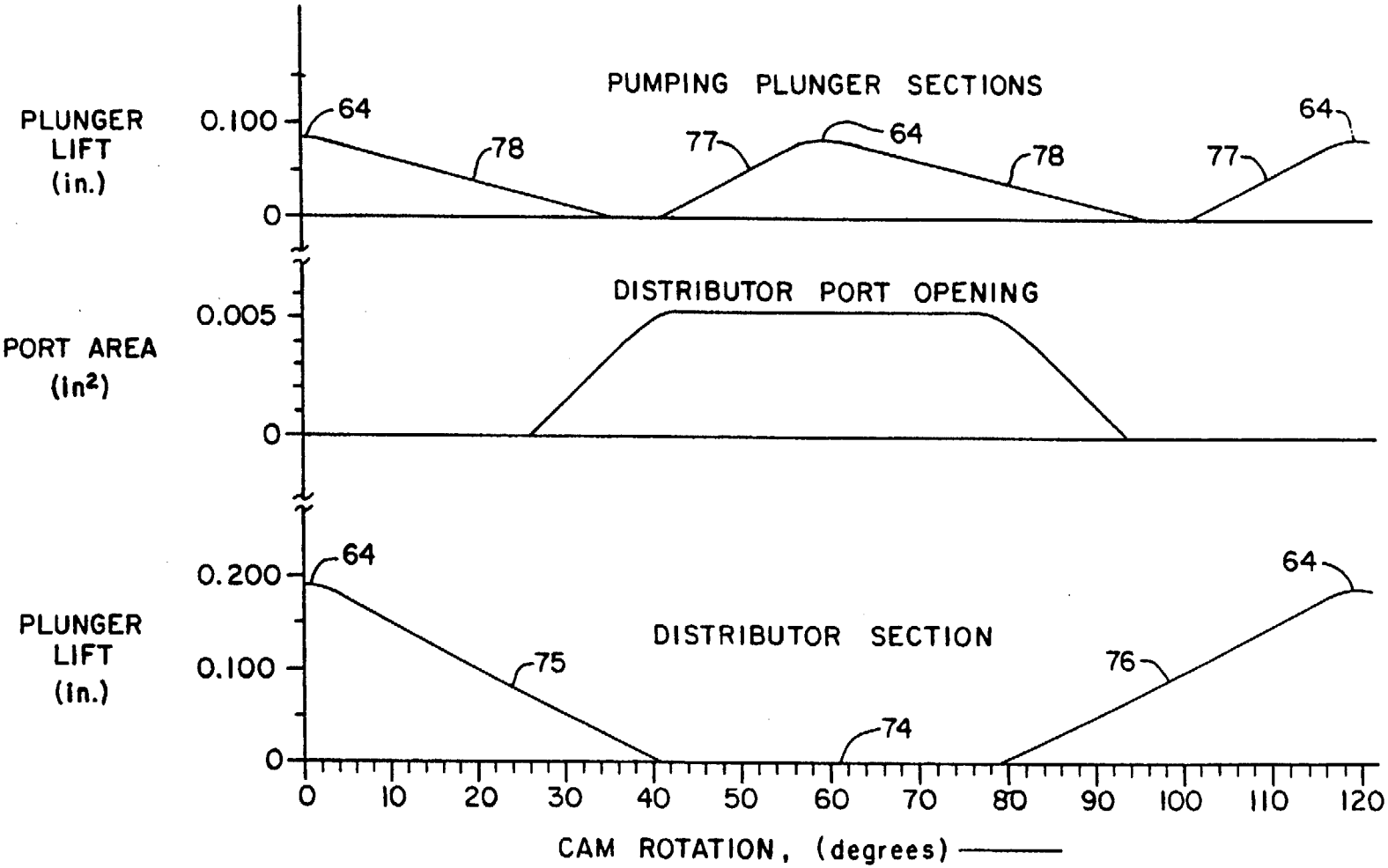
FIG. 8 is a diagram illustrating certain features of the cam and plunger mechanism shown in FIG. 3.

The cam 62 has a dwell or distributor cam section 74 (in place of a sixth cam lobe 64) for positioning the active distributor valve plunger 14 for opening the respective distributor port 70. Referring to FIG. 3, the dwell cam section 74 is a recessed section having a radius greater than the rest of the cam 62 (e.g., by 0.100 inch). Referring to FIG. 8, the dwell cam section 74 has an angular width of 36° and leading and trailing intake and pumping ramps 75, 76 having the same slope as the remaining pumping ramps 77 of the cam 62. As also indicated in FIG. 8, the active distributor port 70 is fully open during the entire pumping stroke and most of the following intake stroke and is at least partly open for 68°. Before each distributor port 70 is fully closed, the next active port 70 is partly opened.

Figure 9:
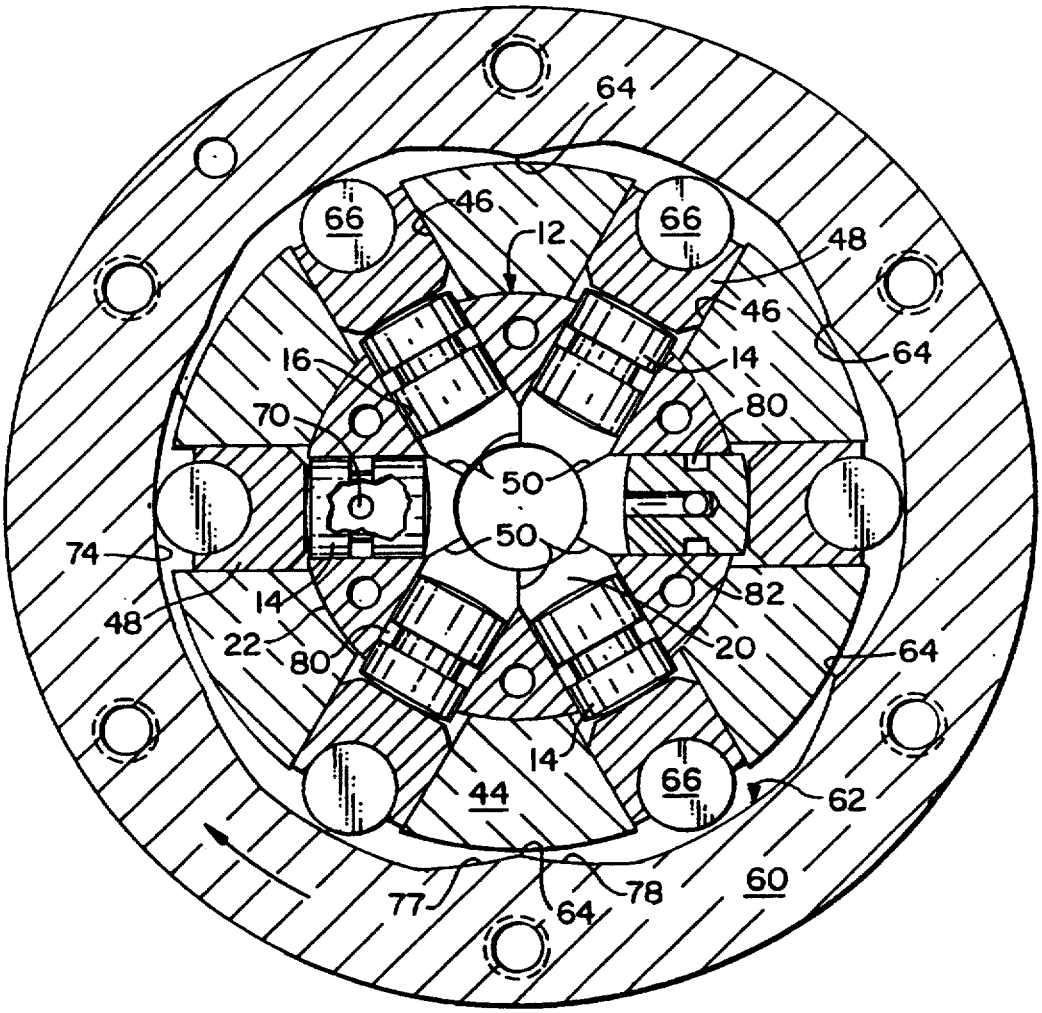
FIGS. 9 and 10 are enlarged, partial transverse section views, partly broken away and partly in section, showing modified cam and plunger mechanisms of the fuel injection pump.
Figure 10:
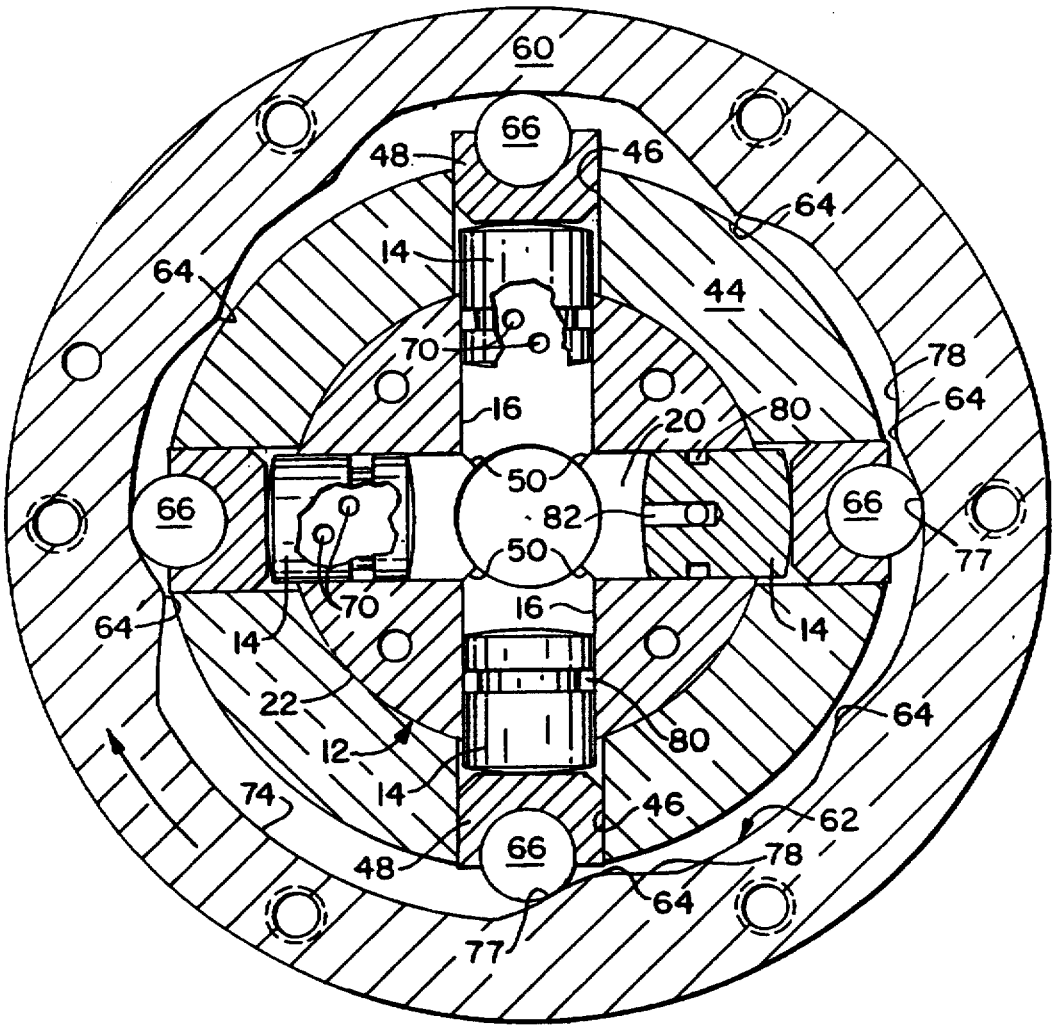

FIGS. 9 and 10 show modified cam and plunger mechanisms. In both FIGS. 9 and 10, all of the plunger bores 16 are provided in a single plane and the pumping chamber 20 is formed solely by the intersecting plunger bores 16. In FIG. 9, the mechanism has five cam lobes 64 and six equiangularly spaced plungers 14 and is designed for use with a six cylinder engine like the mechanism shown in FIG. 3. In FIG. 10, the mechanism has six cam lobes 64 and four equiangularly spaced pumping plungers 14 and is designed for use with an eight cylinder engine. The corresponding distributor head 42 (not shown) has eight distributor outlets for eight injectors and each plunger bore 16 has two axially and angularly spaced distributor ports 70 for two distributor outlets. In both FIGS. 9 and 10, each plunger 14 has a peripheral annulus 80 and an internal passage 82 (consisting of radial and axial bores) for connecting the respective distributor port(s) 70 to the pumping chamber 20 at the inner end of the plunger 16. Thus, each plunger 14 serves as a spool valve for selectively opening the respective distributor port(s) 70.

In FIG. 9, the dwell section 74 is a raised section which extends 60° (equal to the angle between adjacent cam lobes 64) and has a radius equal to the radius of the nose or apex of the cam lobes 64. In FIG. 10, the cam 62 has two alternating dwell sections 74, each having an angular width of 45°. Both dwell sections 74 are recessed generally like the dwell section 74 shown in FIG. 3 but at different radii for the two axially spaced distributor ports 70. In all three mechanisms shown in FIGS. 3, 9 and 10, the plungers 14 are dimensioned and the cams 62 are contoured so that the inactive distributor ports 70 are sealed during the inward pumping strokes of the pumping plungers by a minimum plunger sealing land of 0.040 inch.

The mechanisms shown in FIGS. 3, 9 and 10 may also be used with an engine having half as many cylinders (injectors) as plungers 14 by providing one distributor port 70 in every other plunger bore 16 and by operating the control valve 9 to deliver fuel during every other cam cycle (i.e., by leaving the control valve 9 open during alternating inactive cam cycles). Thus, for example, a pump having four, six or eight plungers 14 and designed for six or eight cylinders as described could be easily modified for use with two, three or four cylinder engines respectively.

Referring to FIG. 1, a suitable delivery valve 88 is preferably provided in each distributor outlet 45 to control the downstream fuel pressure between fuel injection events and prevent secondary fuel injections. The delivery valve 88 may be a combined snubber and shuttle valve like that disclosed in copending U.S. patent application Ser. No. 730,676, filed Jul. 16, 1991 and entitled "Fuel System For Rotary Distributor Fuel Injection Pump" and assigned to the assignee of the present application.

The control valve 9 is a bidirectional flow, electromagnetic valve. The valve 9 is open at the beginning of each intake phase of the operating cam 62 provided by the intake ramps 78. During the intake phase, fuel is supplied under pressure to the pumping chamber 20 to force the plungers 14 outwardly at a rate determined by the slope of the intake ramps 78. The valve 9 is timely closed, normally before the end of the intake phase, by energizing a valve solenoid 82. The outward intake strokes of the plungers 14 are terminated when the valve 9 is closed. The fuel pressure (e.g., 10 psi) in the housing cavity opposes the outward movement of the plungers 14 to prevent plunger overtravel after the valve 9 is closed (and thereby to prevent cavitation caused by such overtravel). The amount of fuel delivered to the pumping chamber 20 before the valve 9 is closed is determined by the outward intake strokes of the plungers 14 and therefore the pump profile.

The valve 9 remains closed until after the initial part of the following pumping phase of the cam 62 provided by the cam pumping ramps 77. During that initial phase, any play between the cam 62 and plungers 14 is first eliminated and then the active pumping plungers 14 (i.e., all of the plungers 14 except the active distributor valve plunger 14) are actuated inwardly together to deliver a charge of fuel from the pumping chamber 20 at highpressure for fuel injection. It is expected that a fuel charge can be delivered at 14,000 psi and higher.

The valve solenoid 82 is normally deenergized before the end of each pumping stroke to open the control valve 80 and spill fuel from the pumping chamber 20 and thereby terminate the fuel injection event. The electrical operation of the solenoid 82 is regulated by a suitable electrical control unit (not shown) to precisely regulate both the fuel injection timing and size of the injected charge. A high resolution angle sensor 90 is provided for measuring the rotation of the cam ring 60 for use in regulating the solenoid operation as described in U.S. Pat. No. 4,757,795 and in copending application Ser. No. 598,035, filed Oct. 16, 1990 and entitled "Processor Based Fuel Injection Control System" and assigned to the assignee of this application. The sensor 90 has an indexing disk 92 mounted on the drive shaft 24 and an infrared pickup 94 mounted on the housing 26 for generating a pulse train having a pulse for each predetermined small increment of rotation of the cam ring 60.

Figure 4:
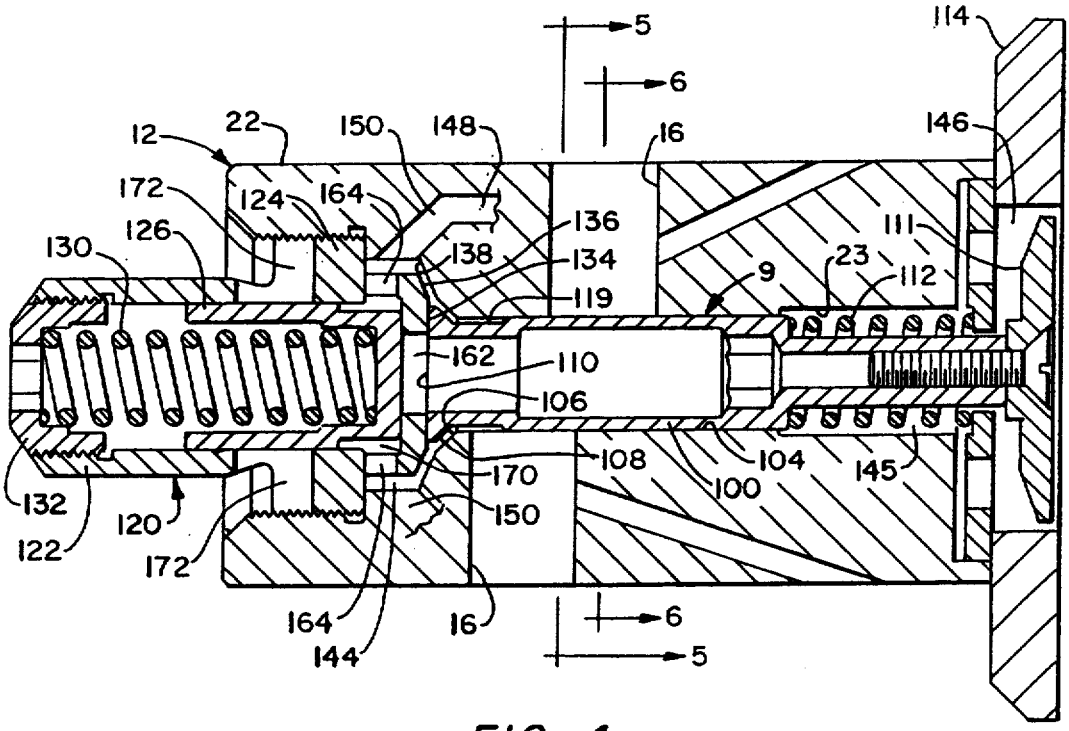
FIG. 4 is an enlarged, longitudinal section view, partly broken away and partly in section, of a pump body subassembly of the fuel injection pump, showing a regulator valve in a closed position thereof and a poppet valve in an open position thereof.
Figure 7:
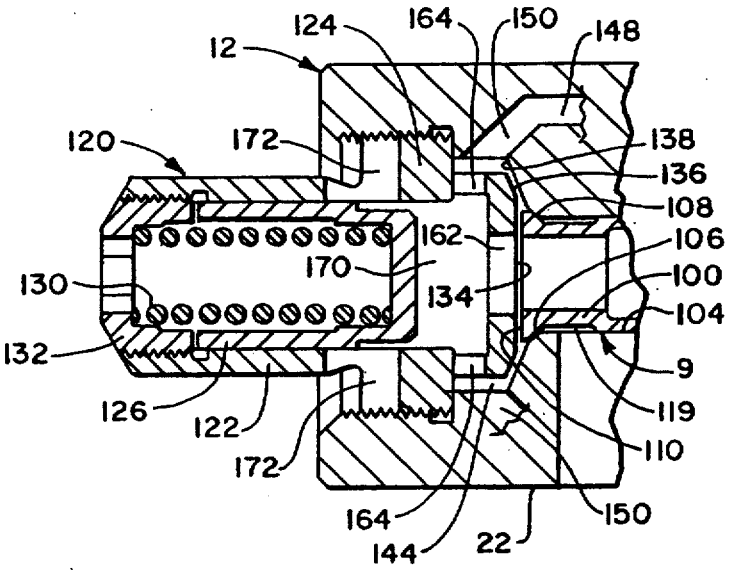
FIG. 7 is a partial longitudinal section view, partly broken away and partly in section, of the pump body subassembly, showing the regulator valve in an open position thereof and the poppet valve in a closed position thereof.
Figure 5:
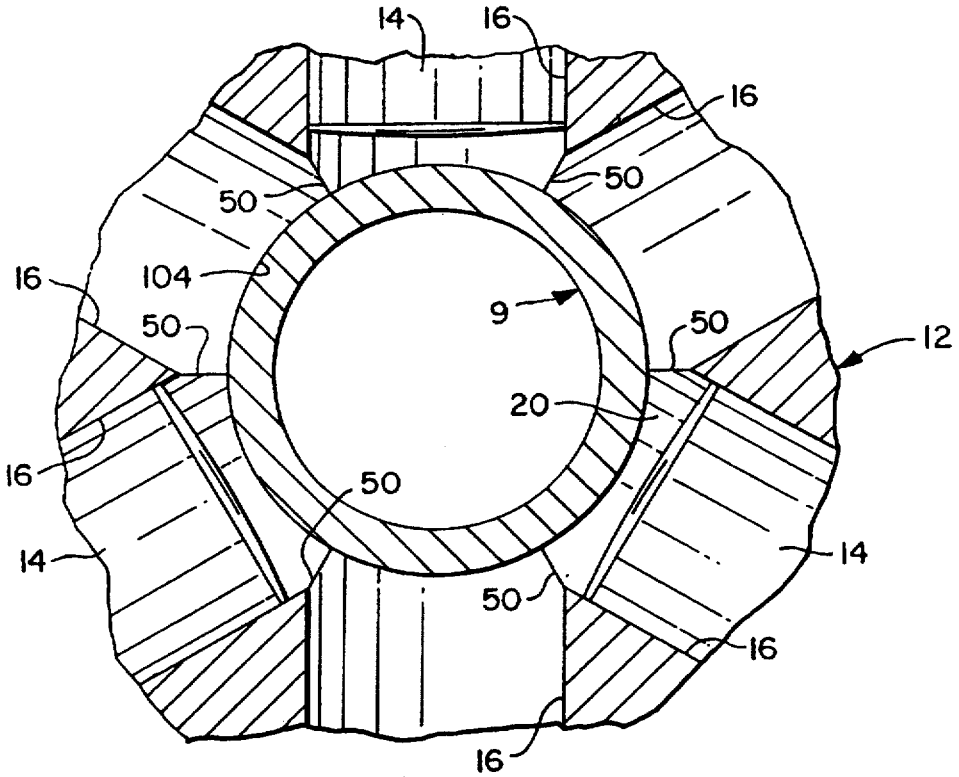
FIGS. 5 and 6 are enlarged partial transverse section views, partly broken away and partly in section, taken substantially along lines 5—5 and 6—6 respectively of FIG. 4.
Figure 6:
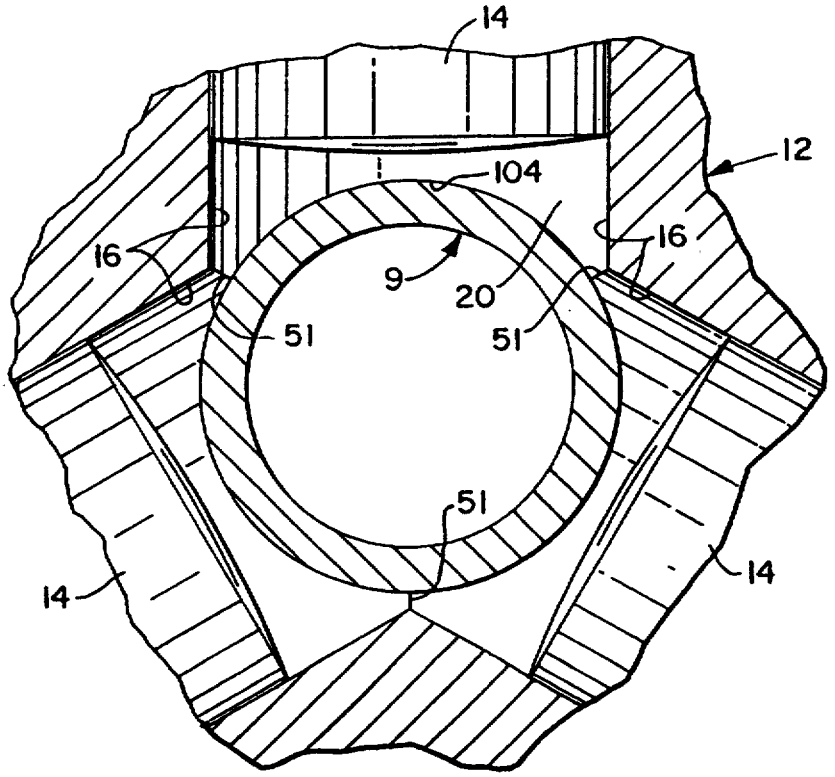

Referring to FIGS. 4 and 7, the control valve 9 has a poppet valve member 100, The poppet valve 100 is mounted within the coaxial valve bore 104 in the pump body 12 to overlap and close the inner ends of the plunger bores 16. The poppet valve 100 is formed as a sleeve to reduce its mass and increase its responsiveness. The solenoid 82 is mounted on the distributor head 40 coaxially aligned with the poppet valve 100. A rectangular armature plate 111 is secured to the outer end of the poppet valve stem. The armature 111 is mounted adjacent to a rectangular pole face of an E-shaped stator core 113 of the solenoid 82 to be attracted by the solenoid 82, when energized, to close the poppet valve 100. The armature plate 111 is received within a slightly enlarged rectangular opening in a spacer sleeve 114 to maintain the armature plate 111 in proper alignment with the stator pole face.

The poppet valve 100 has an enlarged head 106 at its inner end with a frustoconical face 108 engageable with a frustoconical valve seat 110 on the pump body 12. The valve seat 110 diverges outwardly slightly (e.g., 5°) from the valve face 108 so that the valve face 108 has line engagement with the inner circular edge of the seat 110. A coil compression spring 112 opens the poppet valve 100 when the valve solenoid 82 is deenergized. The valve bore 104 and valve stem have a diameter (e.g., 0.350 inch) larger than the diameter (e.g., 0.330 inch) of the plunger bores 16 to facilitate machining the plunger bores 16.

The poppet valve stem has a peripheral annulus 119 which partly overlaps the inner bank of plunger bores 16 for connecting an annular valve opening between the opposed valve face 108 and valve seat 110 to the pumping chamber 20 when the poppet valve 100 is open. Thus, the high pressure chamber of the fuel injection pump is formed by the inner ends of the plunger bores 16 and the annulus 119. The annulus 119 extends inwardly from the poppet valve head 106 to minimize required poppet valve movement to open the valve 9. During each intake stroke, while the valve 9 is open, fuel is delivered via the valve opening and annulus 119 to the pumping chamber 20. During each pumping stroke, after the valve 9 is reopened, fuel is spilled from the pumping chamber 20 via the annulus 119 and valve opening. The active distributor port 70 remains open until well after the valve 9 is reopened to permit flow through the port 70 in both directions to reset the pressure in the downstream fuel line between fuel injection events.

A pressure regulator or relief valve 120 is mounted in coaxial alignment with the poppet valve 100. The regulator 120 has an outer body 122 with an externally threaded, radial flange 124 screwed into an enlarged threaded opening in the pump body 12 and into engagement with a pump body locating shoulder. The front end face of the regulator body 122 has a central radial section 134 aligned with the poppet valve 100 and an outer frustoconical section 136 axially spaced from a conforming frustoconical face 138 of the pump body 12. The central end face 134 provides a stop for limiting the opening axial movement (e.g., 0.008 inch) of the poppet valve 100. The opposed frustoconical faces 136, 138 provide an annular passage immediately outwardly of the annular valve opening.

Fuel is supplied to the poppet valve 100 via an annular fuel chamber 144 which surrounds the forward end of the regulator body 122. A supply pump 154 continuously supplies fuel to the annular fuel chamber 144 via the spring chamber 145 and end chamber 146 at the outer end of the pump body 12, six equiangularly spaced radial bores 147, 160 in the pump body 12, six axial bores 148 in the pump body 12 (located between the pumping plunger bores 16) and six inclined radial bores 150 connecting the inner ends of the axial bores 148 to the annular fuel chamber 144. The supply pump 154 is a positive displacement, vane type pump mounted on and driven by the pump drive shaft 24. The supply pump 154 supplies fuel to the spring chamber 145 and outer end chamber 146 via drilled passages 156, 158 in the pump housing 26 and via the enlarged radial bore 160.

An internal valve member 126 of the regulator 120 is biased into engagement with the front end of the regulator body 122 by a compression spring 130. The spring preload is set during assembly by angular adjustment of a spring seat 132. A front passage and a radial bypass passage are provided between the outer annular fuel chamber 144 and a front, internal pressure chamber 170 in the regulator body 122. The front passage is provided around the front end of the regulator body 122 and through a front central opening 162. The bypass passage is provided by two or more radial ports 164 in the regulator body 122. Thus, the fuel pressure in the outer annular chamber 144 is dependent on the pressure in the internal pressure chamber 170 and the fuel flow via those two parallel passages. The regulator 120 provides a speed correlated fuel pressure in the internal pressure chamber 170 which increases with pump speed (e.g., from 50 to 150 psi). The regulator 120 spills excess fuel via radial outlet ports 172. The excess fuel is conducted from the outlet ports 172 primarily via the roller bearing 32 and between the pump body 12 and roller shoes 48 to the pump housing cavity. A portion of the excess fuel may be returned directly to the supply pump inlet 174 via axial and radial bores 176, 177 in the pump drive shaft 24. A preset needle 180 is provided in the radial bore 177 for regulating the amount of fuel directly returned to the pump inlet 174. A filter 178 is provided in the axial bore 176 to filter that fuel. In a conventional manner, the housing cavity pressure is maintained at a constant relatively low level (e.g., 10 psi) and excess fuel is returned to the fuel tank (not shown).

When open, the poppet valve 100 engages the end face 134 of the regulator body 122 to close the downstream opening 162. When the poppet valve 100 is opened, the fuel pressure in the annular supply chamber 144 increases substantially due to the closure of the opening 162, the restricted flow through the bypass ports 164 and the momentum of the upstream column of fuel. The resulting pressure spike helps accelerate the plungers 14 outwardly against the intake ramps 78 during the intake phase to fill the pumping chamber 20 to the extent permitted by the cam 62. When the poppet valve 100 is closed, fuel is conducted to the internal pressure chamber 170 approximately equally via the two parallel passages. That flow quickly removes the hot spilled fuel from the prior pumping stroke so that it is not resupplied to the pumping chamber 20 during the next intake stroke.

The regulator valve member 126 is axially displaced, for example 0.250 inch, from its forward limit position before it connects the internal pressure chamber 170 to the outlet ports 172. The regulator 120 thereby serves as an accumulator to maintain the fuel pressure sufficiently high throughout the full range of operation of the pump.

Figure 11:
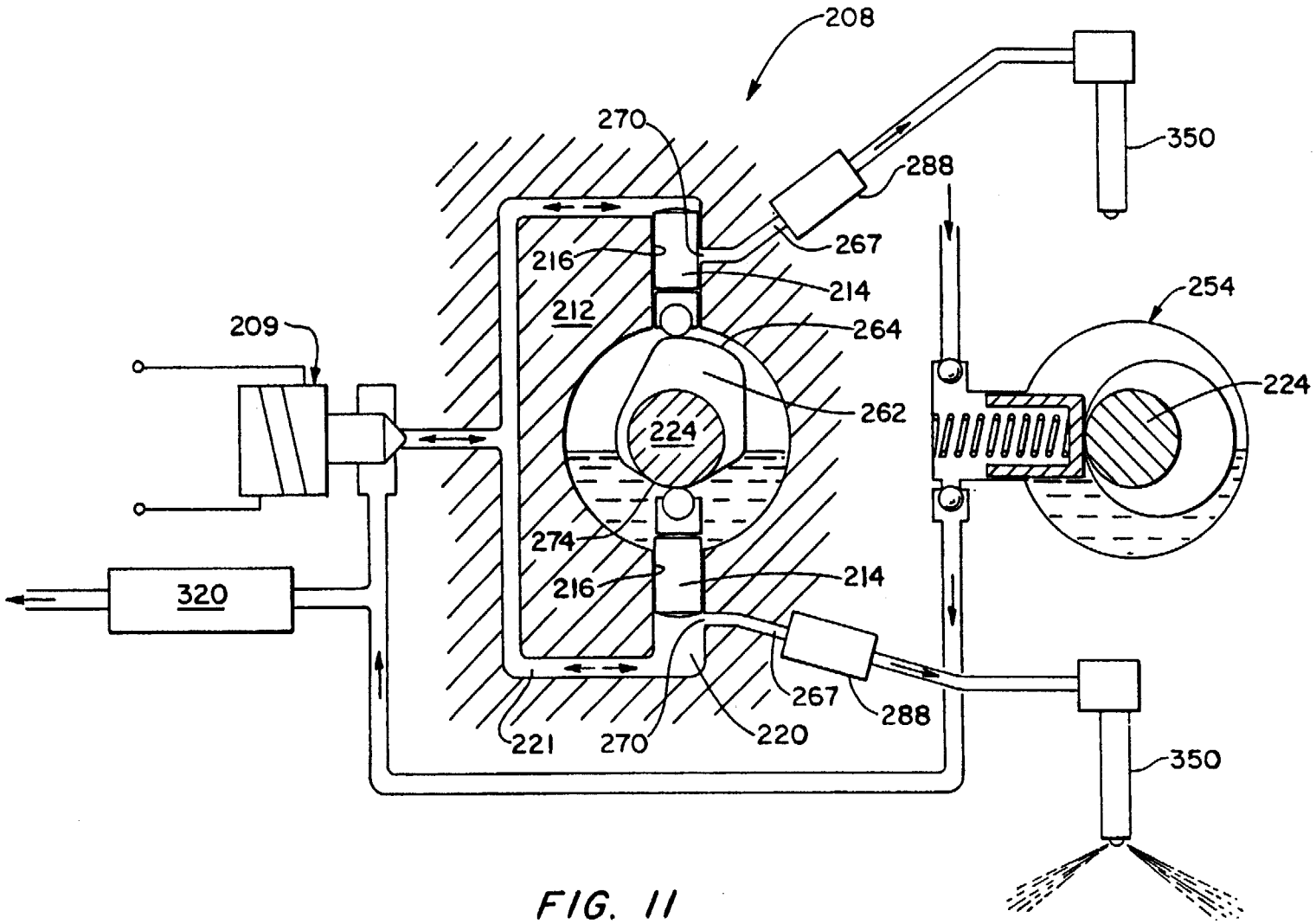
FIG. 11 is a diagrammatic illustration, partly broken away and partly in section, of another type of fuel injection pump incorporating another embodiment of the present invention.

FIG. 11 illustrates another type of Distributor Type Fuel Injection Pump 208 which incorporates another embodiment of the present invention. The pump 208 has a pumping chamber 220 with a pair of diametrically opposed radial plunger bores 216 and a passage 221 in the pump body 212 connecting the outer ends of the two plunger bores 216. The pumping chamber 20 has a relatively large dead volume and is primarily useful with low viscosity fuels such as gasoline and methanol where high pressure fuel injection is not needed.

A central rotary cam 262 is mounted between the plungers 214. The cam 262 has a single cam lobe 264 (i.e., one less than the number of plungers 14) and a diametrically opposed dwell cam section 274. A positive displacement supply pump 254 is driven by the pump drive shaft 224 to supply fuel at a pressure established by a pressure regulator 320. An electromagnetically operated control valve 209 provides the described fill-spill mode of operation (i.e., precisely regulates the intake charge of fuel supplied to the pumping chamber 220 during the intake phase and precisely spill terminates the fuel injection event during the pumping phase).

The exemplary pump 208 is designed for use with a two cylinder engine having two fuel injectors 350. Each plunger bore 216 is connected to a corresponding fuel injector 350 via a distributor bore 267 in the pump body 212 and a delivery valve 288. The two plungers 214 alternately serve as distributor valves for alternately opening the respective distributor ports 270. The pump 208 may employ a greater number of plungers 214 ant an operating cam 262 with a corresponding appropriate number of cam lobes 264 (i.e., one less than the number of pumping plungers 214) for an internal combustion engine having more than two injectors.

Pump embodiments for 2, 4, 6 and 8 cylinder engines are shown and/or described herein. It is to be understood that the present invention is also applicable to fuel injection pumps for 3 and 5 cylinder engines and engines having more than 8 cylinders.

As will be apparent to persons skilled in the art, various modifications, adaptations and variations of the foregoing specific disclosure can be made without departing from the teachings of the present invention.

I claim:

1. In a fuel injection pump having a pump body with a pumping chamber with a plurality of plunger bores, a plunger mounted in each plunger bore for reciprocation, *with one end face of the plunger facing toward the pumping chamber,* rotary cam means rotatable about a cam axis for reciprocating the plungers to provide alternating intake and pumping phases of operation for respectively supplying an intake charge of fuel to the pumping chamber and delivering a charge of fuel from the pumping chamber at high pressure for fuel injection, valve means for supplying intake charges of fuel to the pumping chamber during the intake phases, a plurality of distributor outlets and a delivery system for delivering the high pressure charges of fuel from the pumping chamber to the distributor outlets; the improvement wherein a plurality of the plungers serve as distributor valves in sequence, *connecting the distributor outlets in sequence directly to the pumping chamber;* wherein the delivery system comprises a plurality of distributor ports for the plurality of distributor outlets respectively, each in a distributor valve bore, for connecting the bore to the respective distributor outlet; each distributor valve having a distributor position for each respective distributor port [for] *and forming the sole means, in each distributor position thereof,* opening the distributor port *to the pumping chamber adjacent said one end face of the distributor valve for connecting the respective distributor outlet directly to the pumping chamber* for delivering a high pressure charge of fuel from the pumping chamber, via the *distributor valve bore and* distributor port, *directly* to the respective distributor outlet; wherein a plurality of the plungers serve as pumping plungers; and wherein the rotary cam means is operable during each pumping phase to actuate at least one pumping plunger to deliver a high pressure charge of fuel from the pumping chamber and to position one distributor valve in a distributor position thereof to distribute the high pressure charge of fuel to the respective distributor outlet.

2. A fuel injection pump according to claim 1 wherein the plunger bores are angularly spaced around *and* have axes extending generally radially outwardly from the cam axis, and wherein the rotary cam means comprises annular cam means surrounding the plungers for actuating the pumping plungers radially inwardly during the pumping phases for delivering the high pressure charges of fuel.

3. A fuel injection pump according to claim 1 wherein the plunger bores are angularly spaced around and have axes extending generally radially outwardly from the cam axis, wherein the rotary cam means is mounted radially inwardly of the plungers for actuating the pumping plungers radially outwardly during the pumping phases for delivering the high pressure charges of fuel and wherein the pumping chamber in the pump body comprises a passage connecting the outer ends of the plunger bores.

4. A fuel injection pump according to claim 1, wherein all of the plungers serve as distributor valves in sequence and wherein during each pumping phase, all of the plungers except the acting distributor valve are actuated by the cam means for delivering a high pressure charge of fuel for fuel injection.

5. A fuel injection pump according to claim 2 wherein the pump body has a central coaxial valve bore *between the inner ends of the plunger bores*, wherein the plunger bores extend radially inwardly to the central valve bore, and wherein the valve means comprises a valve member *mounted in the valve bore between the inner ends of the plunger bores and* axially shiftable in the valve bore between open and closed axial positions thereof.

6. A fuel injection pump according to claim 5 further comprising a fuel supply pump, a supply chamber connected to receive fuel continuously from the supply pump, a pressure regulator having a regulator chamber and operable for regulating the fuel pressure in said regulator chamber, and a pair of fuel passages connected in parallel between the supply chamber and regulator chamber, the valve member being operable in its open position to at least partly block one of said pair of passages downstream of said valve member to supply fuel via said one passage and the open valve member to the pumping chamber, the other of said passages being restricted to increase the flow through said one passage and the open valve member to the pumping chamber.

7. A fuel injection pump according to claim 5 further comprising a fuel supply pump, a supply chamber connected to receive fuel continuously from the supply pump, a pressure regulator having a regulator chamber and operable for regulating the fuel pressure in said regulator chamber, and fuel passage means connected between the supply chamber and regulator chamber, the valve member being operable in its open position to at least partly block said passage means downstream of the valve member to increase the rate of supply of fuel via the passage means and open valve member to the pump chamber.

8. A fuel injection pump according to claim 7 wherein said passage means comprises a passage opening downstream of and in alignment with the valve member and closed by the valve member in the open position thereof.

9. A fuel injection pump according to claim 5 wherein the plunger bores intersect at their inner ends to form ports in the pump body interconnecting the plunger bores.

10. A fuel injection pump according to claim 9 wherein the pumping chamber in the pump body is formed substantially entirely by the plunger bores.

11. A fuel injection pump according to claim 5 wherein the valve member is a poppet valve having a peripheral annulus for supplying fuel to and spilling fuel from the pumping chamber in the open position of the valve member, the peripheral annulus continuously overlapping at least some of the plunger bores as the valve member is axially shifted between its open and closed positions.

12. A fuel injection pump according to claim 5 wherein the valve means comprises an electromagnetic actuator having a stator in axial alignment with the valve member and an armature fixed to the valve member, the stator being operable when the electromagnetic actuator is energized to attract the armature *and valve member* in one axial direction toward the stator to axially shift the valve member to one of its said positions and spring means operable for axially shifting the valve member in the opposite axial direction to its other position when the electromagnetic actuator is deenergized.

13. A fuel injection pump according to claim 12 wherein the [electromagnetic actuator] *armature* comprises [an] *a transverse* armature plate [fixed to the valve member] and *the stator comprises* an E-shaped stator core to attract the armature plate and *plate and valve member* toward the stator core to axially shift the valve member to its said one position when the electromagnetic actuator is energized.

14. A fuel injection pump according to claim 1 wherein the delivery system comprises two axially spaced distributor ports in each distributor valve bore, wherein each distributor valve has two axially spaced distributor positions for the two respective distributor ports, and wherein the cam means is operable to position the distributor valves in the distributor positions thereof in sequence.

15. A fuel injection pump according to claim 2 wherein the pump body has a central, axially extending valve bore between the inner ends of the plunger bores, wherein the plunger bores extend radially inwardly to the central valve bore, and wherein the valve means comprises a valve member *mounted in the valve bore between the plunger bores and* shiftable in the valve bore between open and closed positions thereof, the valve member in its open position being operable to supply fuel to the pumping chamber via the inner ends of at least some of the plunger bores.

16. A fuel injection pump according to claim 15 wherein the plunger bores are provided in two axially offset banks of alternating plunger bores and wherein the plunger bores of each bank intersect the adjacent plunger bores of the other bank at their inner radial ends to form a plurality of ports in the pump body interconnecting the plunger bores.

17. A fuel injection pump according to claim 1 wherein less than all of the plungers serve as distributor valves and all of the plungers serve as pumping plungers.

18. A fuel injection pump according to claim 1 wherein all of the plungers serve as both distributor valves and pumping plungers.

19. A fuel injection pump according to claim [5] *2* wherein the pump comprises a distributor head having a generally cylindrical bore *coaxial with the rotary cam means*, wherein the pump body has an outer, *coaxial*, generally cylindrical surface received within the distributor head bore *to provide a coaxial, generally cylindrical interface between the pump body and distributor head*, wherein the distributor outlets are provided in the distributor head angularly spaced around *the generally cylindrical interface* [the pump body], and wherein the [distributor] *delivery* system comprises connecting bores in the pump body and distributor head connecting the distributor ports to the distributor outlets respectively *across the generally cylindrical interface*.

20. A fuel injection pump according to claim 1 wherein each distributor valve has a peripheral annulus and an internal passage connecting the peripheral annulus to the pumping chamber [the peripheral annulus of] *adjacent said one end face of the distributor valve*, each distributor valve, in each distributor position thereof, opening the respective distributor port *to the pumping chamber via the peripheral annulus and internal passage of the distributor valve for connecting the respective distributor outlet directly to the pumping chamber* for delivering a high pressure charge of fuel from the pumping chamber, *via the distributor valve bore, the internal passage and peripheral annulus of the distributor valve and the distributor port, directly* to the respective distributor outlet.

21. A fuel injection pump according to claim 4 wherein the cam means comprises at least one recessed cam section for sequentially positioning the distributor valves in their distributor positions.

22. A fuel injection pump according to claim 21 wherein the cam means comprises sloping cam sections, with the same slope, at opposite ends of said one recessed cam section.

23. A fuel injection pump according to claim 4 wherein the cam means comprises at least one raised cam section for sequentially positioning the distributor valves in their distributor positions.

24. In a fuel injection pump having a fixed pump body with a pumping chamber with a plurality of plunger bores angularly spaced around and having axes extending generally radially outwardly from a cam axis, a plunger mounted in each plunger bore for reciprocation, *with an inner end face of the plunger facing inwardly toward the pumping chamber*, annular cam means surrounding the plungers and rotatable about the cam axis for reciprocating the plungers to provide alternating intake and pumping phases of operation for respectively supplying an intake charge of fuel to the pumping chamber and delivering a charge of fuel from the pumping chamber at high pressure for fuel injection, *a* valve [means] *member* selectively operable for supplying an intake charge of fuel to the pumping chamber during the intake phase and spilling fuel from the pumping chamber during the pumping phase, a plurality of distributor outlets and a delivery system for delivering the high pressure charges of fuel from the pumping chamber to the distributor outlets; the improvement wherein a plurality of the plungers serve as distributor valves in sequence, *connecting the distributor outlets in sequence directly to the pumping chamber*; wherein the delivery system comprises a plurality of distributor ports for the plurality of distributor outlets respectively, each in a distributor valve bore, for connecting the bore to the respective distributor outlet; each distributor valve having a distributor position for each respective distributor port [for] *and forming the sole means, in each distributor position thereof,* opening the distributor port *to the pumping chamber adjacent said inner end face of the distributor valve for connecting the respective distributor outlet directly to the pumping chamber* for delivering a high pressure charge of fuel from the [pump chamber] *pumping chamber,* via the *distributor valve bore and* distributor port, *directly* to the respective distributor outlet; wherein the annular cam means and plungers cooperate to distribute the high pressure charges of fuel [form] *from* the pumping chamber via the *distributor valve bores and the* distributor ports to the distributor outlets *in sequence*; wherein the pump body has a central coaxial valve bore *between the plunger bores,* wherein the plunger bores extend radially inwardly to the central valve bore, wherein the plunger bores intersect at their inner ends to form ports in the pump body interconnecting the plunger bores, wherein the pumping chamber *in the pump body* is formed substantially entirely by the plunger bores and wherein the valve [means comprises a] valve member *is mounted in the valve bore between the inner ends of the plunger bores and is* axially shiftable in the valve bore between open and closed axial [position] *positions* thereof.

25. A fuel injection pump according to claim 24 wherein the valve member is a poppet valve having a peripheral annulus for supplying fuel to and spilling fuel from the pumping chamber in the open position of the valve member, the peripheral annulus continuously overlapping at least some of the plunger bores as the valve member is axially shifted between its open and closed positions.

26. A fuel injection pump according to claim 24 further comprising a fuel supply pump, a supply chamber connected to receive fuel continuously from the supply pump, a pressure regulator having a regulator chamber and operable for regulating the fuel pressure in said regulator chamber, and fuel passage means connected between the supply chamber and regulator chamber, the valve member being operable in its open position to at least partly block said passage means downstream of the valve member to increase the rate of supply of fuel via the passage means and open valve member to the pumping chamber.

27. In a fuel injection pump having a pump body with a pumping chamber with a plurality of plunger bores angularly spaced around and having axes extending generally radially outwardly from a central axis, a plunger mounted in each plunger bore for reciprocation, annular cam means surrounding the plungers, the annular cam means and pump body being relatively rotatable about the central axis for reciprocating the plungers to provide alternating intake and pumping phases of operation for respectively supplying an intake charge of fuel to the pumping chamber and delivering a charge of fuel from the pumping chamber at high pressure for fuel injection, a plurality of distributor outlets and a system for delivering the high pressure charges of fuel from the pumping chamber to the distributor outlets, the pump body having a central coaxial bore providing a valve bore intersecting the angularly spaced plunger bores and an annular, coaxial valve seat between the intersection of the valve bore and plunger bores and one end of the central coaxial bore, a valve member having a sealing head at one end thereof and extending axially toward the other end of the central coaxial bore, the valve member being axially shiftable in the valve bore between a closed position thereof with its sealing head in engagement with the valve seat and an open position thereof with its sealing head spaced from the valve seat to form an annular valve opening therebetween, and valve actuating means for shifting the valve member between its open and closed [position] *positions*; the improvement wherein the central coaxial bore is a throughbore, wherein the valve actuating means comprises an electromagnet having a transverse armature plate fixed to the valve member at the other end of the valve member from the sealing head and a stator contiguous to and in axial alignment with the armature plate, the stator being operable when the electromagnet is energized to attract the armature plate in one axial direction toward the stator to shift the valve member to one of its said positions and spring means biasing the valve member in the opposite axial direction to shift the valve member to its other position when the electromagnet is deenergized.

28. A fuel injection pump according to claim 27 wherein the valve member is a poppet type valve member engageable with the valve seat and axially shiftable away from the stator to its open position.

29. A fuel injection pump according to claim 28, further comprising abutment means, at said one end of the valve member, engageable by the valve member to establish the open position of the valve member.

30. A fuel injection pump according to claim 28 wherein the spring means biases the poppet valve member to its open position and wherein the stator, when the electromagnet is energized, attracts the armature plate to shift the poppet valve member against the bias of the spring means into engagement with the valve seat.

31. A fuel injection pump according to claim 27 wherein the fuel injection pump comprises a fuel chamber, with a regulated fuel pressure, in axial alignment with the valve member at said one end of the valve member, [wherein the valve inlet opening is in continuous communication with the fuel chamber,] wherein the valve member comprises a valve sleeve having said sealing head and a coaxial bore with an end opening at said one end of the valve member in continuous communication with said fuel chamber, wherein, in the open position of the valve member, the [sealing head is spaced from the valve seat to form an] annular [fuel passage therebetween connecting the pumping chamber via said axial] valve opening *connects the pumping chamber* to said fuel chamber, and wherein the plurality of plunger bores intersect the valve bore between the ends of the coaxial bore in the valve sleeve.

32. In a fuel injection pump having a pump body with a pumping chamber with a plurality of plunger bores angularly spaced around and having axes extending generally radially outwardly from a central axis, a plunger mounted in each plunger bore for reciprocation, annular cam means surrounding the plungers, the annular cam means and pump body being relatively rotatable about the central axis for reciprocating the plungers to provide alternating intake and pumping phases of operation for respectively supplying an intake charge of fuel to the pumping chamber and delivering a charge of fuel from the pumping chamber at high pressure for fuel injection, a plurality of distributor outlets and a system for delivering the high pressure charges of fuel from the pumping chamber to the distributor outlets, the pump body having a central coaxial bore providing a valve bore intersecting the angularly spaced plunger bores and an annular, coaxial valve seat between the intersection of the valve bore and plunger bores and one end of the central coaxial bore, a valve member having a sealing head at one end thereof and extending axially toward the other end of the central coaxial bore, the valve member being axially shiftable in the valve bore between a closed position thereof with its sealing head in engagement with the valve seat and an open position thereof with its sealing head spaced from the valve seat to form an annular valve opening therebetween, and valve actuating means for shifting the valve member between its open and closed positions; the improvement wherein the central coaxial bore is a throughbore, wherein the fuel injection pump comprises a fuel chamber, with a regulated fuel pressure, in axial alignment with the valve member axially outwardly of said one end of the valve member, wherein the valve member has a coaxial bore with an end opening at said one end thereof in continuous communication with said fuel chamber, wherein said annular valve opening, with the valve member in is open position, connects the pumping chamber to said fuel chamber, and wherein the valve actuating means is mounted at the other end of the valve member from said sealing head.

33. In a fuel injection pump according to claim 32 wherein the valve actuating means comprises an electromagnet having a transverse armature plate fixed to the valve member at the other end of the valve member from the sealing head and a stator contiguous to and in axial alignment with the armature plate, the stator being operable when the electromagnet is energized to attract the armature plate in one axial direction toward the stator to shift the valve member to one of its said positions and spring means biasing the valve member in the opposite axial direction to shift the valve member to its other position when the electromagnet is deenergized.

* * * * *